United States Patent
Schamer et al.

(10) Patent No.: US 8,364,581 B2
(45) Date of Patent: Jan. 29, 2013

(54) SYSTEM AND METHOD FOR PROVIDING TIME TO CURE NEGATIVE BALANCES IN FINANCIAL ACCOUNTS WHILE ENCOURAGING RAPID CURING OF THOSE BALANCES TO A POSITIVE NET POSITION

(75) Inventors: David Schamer, Powell, OH (US); Lee Lemke, Centerburg, OH (US); Jeff Kastelic, Cranberry Township, PA (US)

(73) Assignee: Huntington Bancshares Incorporated, Columbus, OH (US)

( * ) Notice: Subject to any disclaimer, the term of this patent is extended or adjusted under 35 U.S.C. 154(b) by 0 days.

(21) Appl. No.: 13/112,458

(22) Filed: May 20, 2011

(65) Prior Publication Data

US 2012/0054093 A1 Mar. 1, 2012

Related U.S. Application Data

(60) Provisional application No. 61/346,629, filed on May 20, 2010.

(51) Int. Cl.
*G06Q 40/00* (2012.01)
(52) U.S. Cl. .......................... 705/38; 705/35
(58) Field of Classification Search .............. 705/38
See application file for complete search history.

(56) References Cited

U.S. PATENT DOCUMENTS

| | | | |
|---|---|---|---|
| 5,093,787 A * | 3/1992 | Simmons | 705/33 |
| 7,182,253 B1 * | 2/2007 | Long | 235/379 |
| 7,693,784 B2 * | 4/2010 | Rivest et al. | 705/38 |
| 7,792,717 B1 * | 9/2010 | Hankins et al. | 705/35 |
| 7,865,435 B1 * | 1/2011 | Medina, III | 705/39 |
| 7,958,050 B2 * | 6/2011 | Finch | 705/40 |
| 2002/0143596 A1 * | 10/2002 | Carmody | 705/8 |
| 2006/0293983 A1 * | 12/2006 | Rosenblatt et al. | 705/35 |
| 2007/0106558 A1 * | 5/2007 | Mitchell et al. | 705/16 |
| 2009/0327123 A1 * | 12/2009 | Wolfson | 705/39 |
| 2010/0306103 A1 * | 12/2010 | Hankins et al. | 705/40 |
| 2011/0191241 A1 * | 8/2011 | Blain et al. | 705/42 |
| 2012/0078784 A1 * | 3/2012 | Anthony et al. | 705/42 |

* cited by examiner

*Primary Examiner* — Kirsten Apple
(74) *Attorney, Agent, or Firm* — Porter, Wright, Morris & Arthur, LLP

(57) ABSTRACT

A computer implemented method and system for providing financial services are described. The system and method include determining an account balance for a financial account. If the account balance is negative, notice of the negative balance is sent to the account holder in real time. After a predetermined period of time or grace period, and/or by a predetermined end time or cut-off date or time, it is determined whether the negative balance was cured. If the negative balance was not cured during the grace period, an overdraft fee is assessed to the financial account. If the negative balance was cured during the grace period, any assessed overdraft fee for the negative balance is rebated or reversed.

48 Claims, 4 Drawing Sheets

SYSTEM AND METHOD FOR PROVIDING TIME TO CURE NEGATIVE BALANCES IN FINANCIAL ACCOUNTS WHILE ENCOURAGING RAPID CURING OF THOSE BALANCES TO A POSITIVE NET POSITION

CROSS-REFERENCE TO RELATED APPLICATIONS

This application claims the priority benefit of U.S. Provisional Patent Application No. 61/346,629 filed on May 20, 2010, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to financial services and, more particularly, computer implemented methods and systems for covering overdrafts and/or insufficient funds in financial accounts.

BACKGROUND OF THE INVENTION

An overdraft occurs when a withdrawal from a bank or other financial institution account exceeds the available funds in the account. That is, the account has insufficient funds to cover the withdrawal. In the case of withdrawals such as checks or ACH withdrawals, the account provider can return the withdrawal request as unpaid. In the case of preauthorized withdrawals such as ATM withdrawals and debit or check card withdrawals, however, the account provider must pay the withdrawal request when presented, even if the withdrawal causes an overdraft. The account holder must then seek additional funds from the account holder to cover the overdraft and can charge the account holder overdraft fees as a penalty.

Traditionally, the manager of a bank or other financial institution would look at a list of overdrafts each day. If the manager saw that a favored customer had incurred an overdraft, they had the discretion to pay the overdraft for the customer. Banks traditionally did not charge for this ad-hoc coverage but it was fully discretionary. This traditional ad-hoc coverage has practically disappeared.

Account holders today can obtain overdraft protection plans. An overdraft protection plan is a contractual relationship in which the account provider promises to pay overdrafts up to a certain dollar limit. These overdraft lines of credit are typically loans and account holders typically charge a nominal fee per overdraft and also charge interest on the outstanding balance. Some account providers charge a small monthly fee regardless of whether the line of credit is used. Overdraft protection can cover checks, ATM withdrawals, debit or check card withdrawals, electronic transfers, and the like. In the case of non-preauthorized items such as checks or ACH withdrawals, the overdraft protection allows for these withdrawals to be paid as opposed to being returned unpaid or "bouncing". However, not all account holders qualify for such loans.

Another form of protection available today is often referred to as "linked accounts" or "overdraft transfer protection". For example, a checking account can be linked to another account, such as a savings account, credit card account, or line of credit account. Once the link is established, when a withdrawal is presented that would result in an overdraft, funds are automatically transferred from the linked account to the checking account in cover the overdraft. A nominal fee is usually charged for each overdraft transfer, and if the linked account is a credit card or other line of credit, the consumer may be required to pay interest under the terms of that account. However, not all account holders have multiple accounts that can be linked.

A more recent product being offered by some banks and other financial institutions is often referred to as "bounce protection." The bank may choose to cover overdrawn items at their discretion and charge an overdraft fee. As opposed to traditional ad-hoc coverage, this decision to pay or not pay overdrawn items is largely automated and based on objective criteria such as the customer's average balance, the overdraft history of the account, the number of accounts the customer holds with the bank, and the length of time those accounts have been open. However, there is no explicit promise to pay any debit items into overdraft. Rather, this coverage is discretionary on the part of the financial institution. Financial institutions typically charge a one-time fee for each overdraft paid. A financial institution may also charge a recurring daily fee for each day during which the account has a negative balance.

While these overdraft protections may reduce the number of denied requests or "bounced checks" they can still result in large overdraft fees, interest, and the like and a perceived unfairness by customers. Additionally, the financial institution can be required to wait a substantial period of time before payoff of the overdraft is received. This is particularly true for customers that may not be aware of the overdraft until they receive their monthly statement. Accordingly, there is a need for an improved system and method that reduces overdraft fees and/or insufficient funds fees, encourages rapid payoff of overdrafts, and provides perceived "fairness" to customers.

SUMMARY OF THE INVENTION

Disclosed are computer implemented methods and systems which address one or more issues of the above described related art. Disclosed is a computer-implemented method for performing financial services comprising the step of determining an account balance for a financial account of a customer. If the account balance is negative, it is determined after a predetermined period of time and/or a predetermined end time or cut-off date or time, whether the negative balance of the financial account was cured. An overdraft fee is assessed to the financial account if the negative balance of the financial account was not cured during the predetermined period of time. The predetermined period of time preferably extends at least until the next calendar day but can extend at least until the next business day.

Also disclosed is a financial management system comprising software stored on a computer-readable medium and operable to determine an account balance for a financial account of a customer. If the account balance is negative, it is determined after a predetermined period of time and/or a predetermined end time or cut-off date or time, whether the negative balance of the financial account was cured. An overdraft fee is assessed to the financial account if the negative balance of the financial account was not cured during the predetermined period of time. The predetermined period of time preferably extends at least until the next calendar day but can extend at least until the next business day.

Also disclosed is a computer-implemented method for performing financial services comprising the step of determining an account balance for a financial account of a customer. If the account balance is negative, it is determined after a predetermined period of time and/or a predetermined end time or cut-off date or time, whether the negative balance of the financial account was cured. Any assessed overdraft fee for the negative balance is rebated to the financial account if the negative balance of the financial account was cured during the predetermined period of time. The predetermined period of time preferably extends at least until the next calendar day but can extend at least until the next business day.

Also disclosed is a financial management system comprising software stored on a computer-readable medium and operable to determine an account balance for a financial account of a customer. If the account balance is negative, it is determined after a predetermined period of time and/or a predetermined end time or cut-off date or time, whether the negative balance of the financial account was cured. Any assessed overdraft fee for the negative balance is rebated to the financial account if the negative balance of the financial account was cured during the predetermined period of time. The predetermined period of time preferably extends at least until the next calendar day but can extend at least until the next business day.

From the foregoing disclosure and the following more detailed description of various preferred embodiments it will be apparent to those skilled in the art that the present invention provides a significant advance in the technology and art of financial systems and methods. Particularly significant in this regard is the potential the invention affords for providing systems and methods which encourage the rapid payment of overdrafts. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved systems and methods disclosed herein. The following detailed discussion of various alternative and preferred embodiments will illustrate the general principles of the invention. Other embodiments suitable for other applications will be apparent to those skilled in the art given the benefit of this disclosure.

Figure 1:
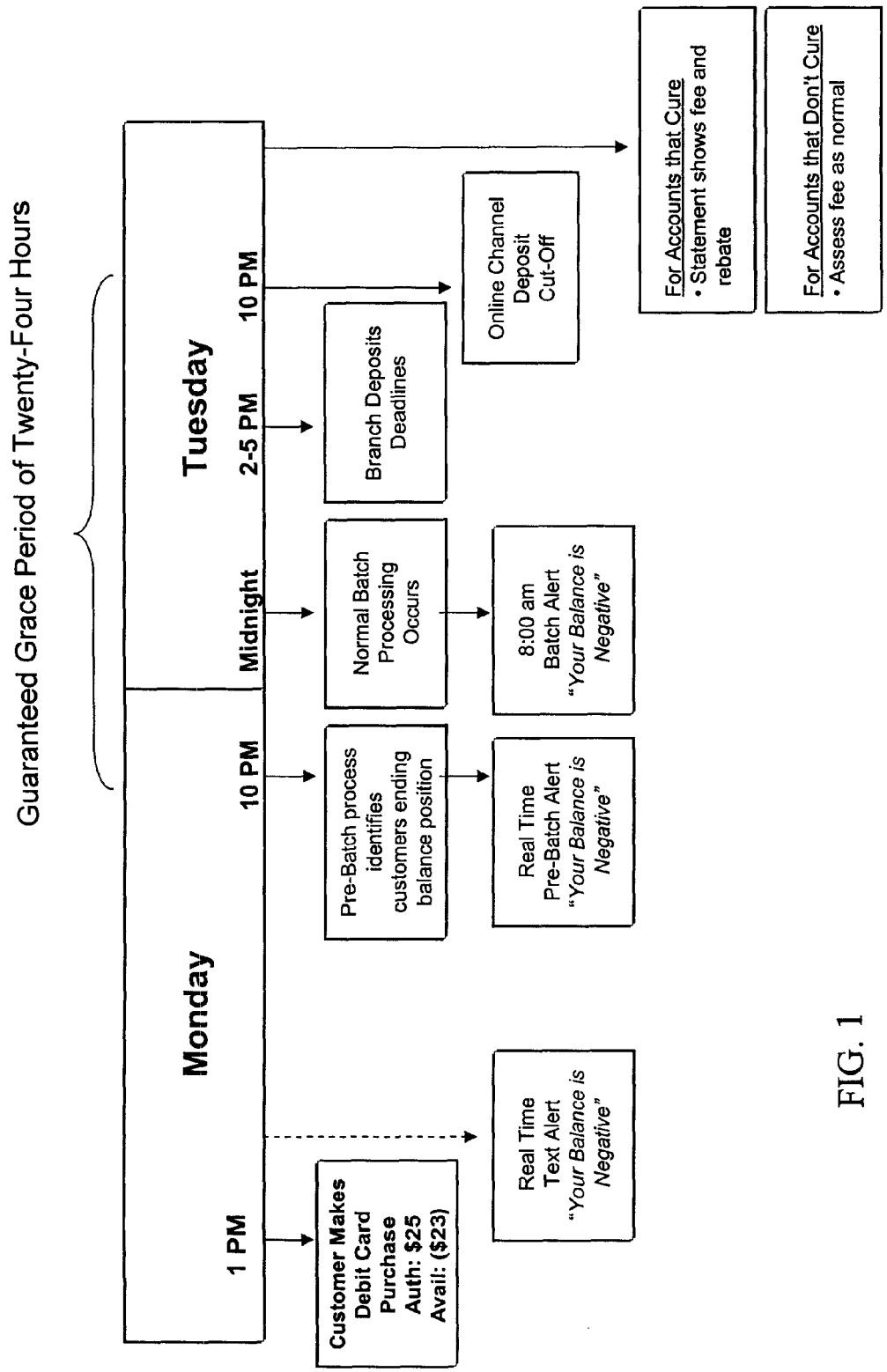
FIG. 1 is a time line showing a method according to a first embodiment of the present invention.

Referring now to the drawings, FIG. 1 illustrates a system and method for encouraging rapid coverage of insufficient funds in financial accounts according to a first embodiment of the present invention. When a customer of a financial institution makes a financial transaction, such as an ATM withdrawal, a debit or check card withdrawal, or the like the financial account of the customer can either have enough funds to cover the transaction or can have less than the required funds to cover the transaction. If the transaction requires more funds than is available in the financial account, the financial account has a negative balance or is in an overdraft condition. In the illustrated embodiment, the customer makes a debit card purchase at 1 PM which is authorized for $25 when the customer's financial account already had a negative balance of $23.

In response to the overdraft, the illustrated financial institution sends an automated electronic transaction alert or notice of the overdraft to the customer. The illustrated electronic transaction alert is sent in real time by automated text message to the customer's mobile phone or the like. The automated electronic transaction alert can additionally or alternatively be sent by automated email to the customer's email address, automated voice message to the customer's phone, or any other suitable means of real time automated electronic communication. The transaction alert notifies the customer that there are insufficient funds in their financial account for the transaction that just occurred, that is, that their account balance is currently negative. The transaction alert can additionally include further information such as, for example, specific identification of the transaction that caused the insufficient funds condition, the amount of the insufficient funds, the deadline for covering the insufficient funds to avoid an overdraft fee or penalty, the overdraft fee or penalty that will be assessed to the financial account if the insufficient funds are not covered by the deadline, and/or any other suitable information.

The following is an exemplary automated electronic transaction alert that can be sent the following the transaction: We're sending this email because your account ending in XXXX was overdrawn today. here's the good news: because you're a XXXX customer you have a grace period which gives you more time to make it right and avoid overdraft fee(s). To take advantage of this grace period just make a timely deposit today or tomorrow and you can avoid overdraft fees from yesterday's overdraft. Your deposit today or tomorrow must be enough so that your account balance at the end of tomorrow is not less than $0. We want to help you avoid the overdraft fee(s) for today's overdraft, so if you have any questions, please don't hesitate to talk to your banker by calling XXX-XXX-XXXX 24 hours a day, 7 days a week, or go online to XXXXXXXX.com.

Typically, an overdraft fee or penalty would be assessed to the customer's account if the overdraft condition was still present at the evening's normal pre-batch processing. Thus, the customer would need to deposit the needed funds to cure the insufficient funds to a branch before the close of business for the day or online before the online-deposit cutoff for the day in order to avoid the overdraft fee or penalty. However, according to the present invention, the customer is given a predetermined period of time or grace period to cover the insufficient funds beyond the evening's normal processing time of the transaction. The predetermined period of time or grace period can be defined by either a length of time from a specific event (for example, length of tune such as twelve or twenty-for hours after the time of processing the transaction) and/or by a predetermined end time or cut-off date or time (for example, noon or midnight the next calendar or business day). Preferably, the grace period extends at least into the next day, that is, the next calendar day after the transaction occurs and/or is processed, and more preferably extends at least into the next business day after the transaction occurs and/or is processed. The next business day is the next calendar day that the financial institution has branches open for business to receive deposits from the customer. In the illustrated, embodiment the customer is given a grace period of one day or twenty four hours (from the processing time on the day of the transaction until the processing time on the next calendar day) in order to cover the insufficient funds. This grace period extends into the next calendar day after the transaction but could alternatively be one day unless the next calendar day is not a business day and then the grace period is as many calendar days as necessary to give the customer at least one business day. Thus, the customer can deposit the needed funds to cure the insufficient funds to a branch before the close of business the following calendar day (if open for business) or online before the online-deposit cutoff for the following day in order to avoid the overdraft fee or penalty. It is noted that the grace period can alternatively be any other suitable period of time. For example, the grace period could be shorter such as, for example, until noon the next calendar day, until a specific branch closes, until all branches close (2 to 5 PM) the next business day, until the online deposit cutoff, or the like. Also for example, the grace period could be longer such as, for example, eighteen-hours, thirty-six hours, forty-eight hours, or more or anything therebetween.

In the illustrated embodiment, the financial institution runs a pre-batch process later that evening at 10 PM which identifies the customer's daily ending balance for their financial account. In response to the overdraft which is still present at the pre-batch process, the financial institution sends an automated electronic pre-batch alert or notice of the continued overdraft to the customer (or initial notice of the overdraft if a prior alert has not been sent). The illustrated automated electronic pre-batch alert is sent in real time by automated text message to the customer's mobile phone or the like. The automated electronic pre-batch alert can additionally or alternatively be sent by automated email to the customer's email address, automated voice message to the customer's phone, or any other suitable means of automated real time electronic communication. The automated electronic pre-batch alert notifies the customer that there is insufficient funds in their financial account at their daily ending balance, that is, that their account balance is currently negative. The automated electronic transaction alert can additionally include further information such as, for example, specific identification of the transactions of the day that caused the insufficient funds, the amount of the insufficient funds, the deadline for covering the insufficient funds to avoid an overdraft fee or penalty, the overdraft fee or penalty that will be assessed to the financial account if the insufficient funds are not covered by the deadline, and/or any other suitable information. It is noted that the automated electronic pre-batch alert would not be sent if a deposit was made to cover the insufficient funds prior to the pre-batch processing such that the customer's ending daily balance was not negative. Alternatively, the automated electronic pre-batch alert could still be sent to notify the customer that the insufficient funds have been successfully covered if a prior over daft alert was previously sent.

The following is an exemplary automated electronic pre-batch alert that can be sent at pre-batch processing if a transaction alert was already sent and the account remains overdrawn: We're sending this email because your account ending in XXXX was overdrawn today and remains overdrawn. here's the good news: because you're a XXXX customer you have a grace period which gives you more time to make it right and avoid overdraft fee(s). To take advantage of this grace period just make a timely deposit tomorrow and you can avoid overdraft fees from yesterday's overdraft. Your deposit tomorrow must be enough so that your account balance at the end of tomorrow is not less than $0. We want to help you avoid the overdraft fee(s) for today's overdraft, so if you have any questions, please don't hesitate to talk to your banker by calling XXX-XXX-XXXX 24 hours a day, 7 days a week, or go online to XXXXXXXX.com.

In the illustrated embodiment, the financial institution runs normal batch processing later that evening at Midnight. In response to the overdraft which is still present at the batch processing, the financial institution sends an automated electronic batch alert or notice of the continued overdraft to the customer (or initial notice of the overdraft if a prior alert has not been sent). The illustrated automated electronic batch alert is sent at a predetermined time the next day, such as the next morning at 8:00 AM, by automated text message to the customer's mobile phone or the like. The automated electronic batch alert can additionally or alternatively be sent by automated email to the customer's email address, automated voice message to the customer's phone, or any other suitable means of automated real time electronic communication. The automated electronic batch alert indicates to the customer that there was insufficient funds in their financial account at their daily ending balance, that is, that their account balance is currently negative. The automated electronic batch alert can additionally include further information such as, for example, specific identification of the transactions of the day that caused the insufficient funds, the amount of the insufficient funds, the deadline for covering the insufficient funds to avoid an overdraft fee or penalty, the overdraft fee or penalty that will be assessed to the financial account if the insufficient funds are not covered by the deadline, and/or any other suitable information. It is noted that the automated electronic batch alert would not be sent if for some reason the batch processing indicated that the customer's ending daily balance was not negative. Alternatively, the automated electronic batch alert could still be sent to indicate to the customer that the insufficient funds have been successfully covered if a prior over draft alert was previously sent. It is noted that the automated electronic batch alert can alternatively be sent in real time, this is particularly advantageous if a pre-batch alert is not sent The following is an exemplary automated electronic batch alert that can be sent the morning following batch processing: We're sending this email because your account ending in XXXX was overdrawn yesterday. here's the good news: because you're a XXXX customer you have a grace period which gives you more time to make it right and avoid overdraft fee(s). To take advantage of this grace period just make a timely deposit today and you can avoid overdraft fees from yesterday's overdraft. Your deposit today must be enough so that your account balance starting tomorrow morning is not less than $0. We want to help you avoid the overdraft fee(s) for yesterday's overdraft, so if you have any questions, please don't hesitate to talk to your banker by calling XXX-XXX-XXXX 24 hours a day, 7 days a week, or go online to XXXXXXXX.com.

It is noted that if desired, one or more of the automated electronic transaction, pre-batch, and batch alerts can be eliminated within the scope of the present invention or other automated electronic alerts or notices can be added within the scope of the invention. For example, the method could include no automated electronic alerts or only one automated electronic alert such as, for example, an automated electronic alert sent the morning after the overdraft transaction. Preferably, customers have an option to enroll in one or more automated electronic alerts as desired by the customer. It is also noted that additional or alternative automated electronic alerts or notices can be sent to customers if desired at other suitable times within the scope of the present invention.

In the illustrated embodiment, the branch deposit cut-off or deadline for the financial institution is 2 to 5 PM the next day (depending on the specific branch) and the online deposit cut-off or deadline for the financial institution is 10 PM. It is noted that these cutoffs or deadlines can alternatively be any other suitable time depending on the financial institution. If the customer fails to make a deposit or deposits by these deadlines such that daily ending balance for the next calendar day remains negative, the financial institution assess an overdraft fee or penalty to the customer's financial account. However, if the customer makes a deposit or deposits by the deadlines such that daily ending balance for the next calendar day is not negative, the financial institution both assesses an overdraft fee or penalty to the financial account and rebates or reverses the overdraft fee or penalty to the customer's financial account. Alternatively, the financial institution can waive the overdraft fee or penalty and not assess it to the customer's financial account.

It is noted that in a variation of the above-described method, the overdraft fee or penalty is assessed to the account at the end of the transaction day as if there was not a grace period and is rebated or reversed if the insufficient funds are covered within the grace period.

The financial account is preferably provided the predetermined period of time to cure the negative balance and the automated electronic alerts without incurring additional costs. That is, the grace period and its associated alerts are provided to the customer by the financial institution as a free service without charging interest, a service fee, or the like for these services to the client's financial account. Wile the financial institution may have reduced income from lost overdraft fees and the like, the illustrated method encourages rapid payoff of overdrafts and/or insufficient funds, and provides a sense of fairness to customers.

Figure 2:
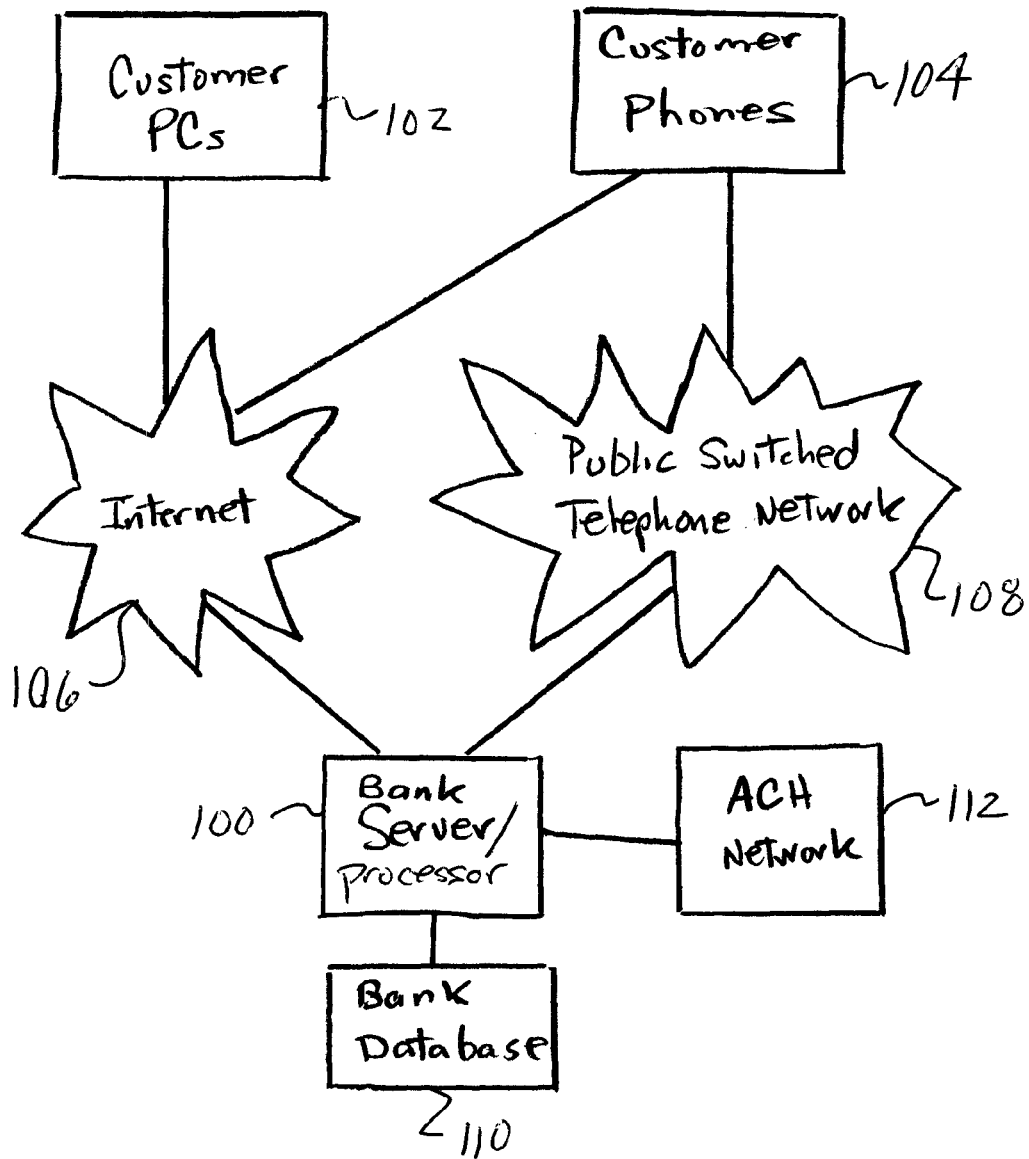
FIG. 2 is a block diagram of a system for carrying out the method of FIG. 1.

FIG. 2 illustrates an exemplary system for carrying-out the above described method which includes a computer system or server 100 of the financial institution which is in communication with customer's wired and unwired computers 102 such a personal computers (PCs), laptop computers, notebook computers, tablet computers, handheld computers, and the like via the Internet 106 or other suitable computer networks and/or the Public Switched Telephone Network (PSTN) 108 or other suitable telephone network. The computer system or server 100 of the financial institution is in communication with customer's wired and unwired telephones 104 and the like via the Internet 106 or other suitable computer networks and/or the Public Switched Telephone Network (PSTN) 108 or other suitable telephone network. The computer system 100 includes or is in communication with a database 110 or the like for storing and retrieving customer information such as, for example, names, phone numbers, email addresses, and the like. The computer system 100 is in communication with the Automated Clearing House (ACH) 112 or the like via a suitable network. The ACH is an electronic network for financial transactions in the United States.

The computer system 100 is programmed with computer software to carry out the above-described method. the computer software is stored on a computer-readable medium and is operable to: determine an account balance for a financial account of a customer and if the account balance is negative, determine after a predetermined period of time whether the negative balance of the financial account was cured. An overdraft fee is assessed to the financial account if the negative balance of the financial account was not cured during the predetermined period of time. The predetermined period of time is at least until the next day which can be the next calendar day or the next business. The predetermined period of time is preferably at least twenty four hours. The computer software is operable to send an automated electronic notice of the negative balance to the customer. The electronic notice(s) is/are sent in real-time at determining the account balance is negative, in real-time at pre-batch ACH processing, real-time at batch ACH processing, and/or the morning of the next day after determining the account balance is negative.

Figure 3:
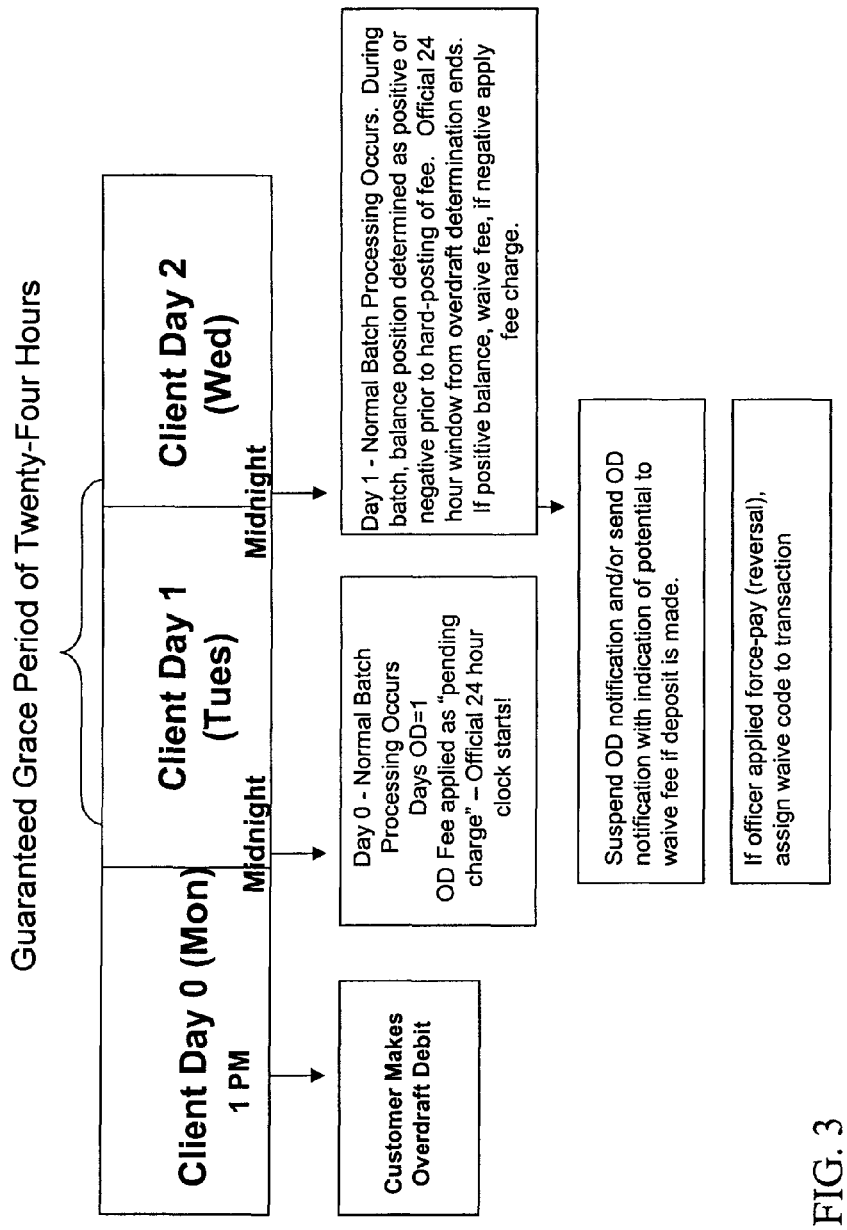
FIG. 3 is a time line showing a method according to a second embodiment of the present invention wherein customers have a twenty-four hour period of time to cure an overdraft balance.
Figure 4:
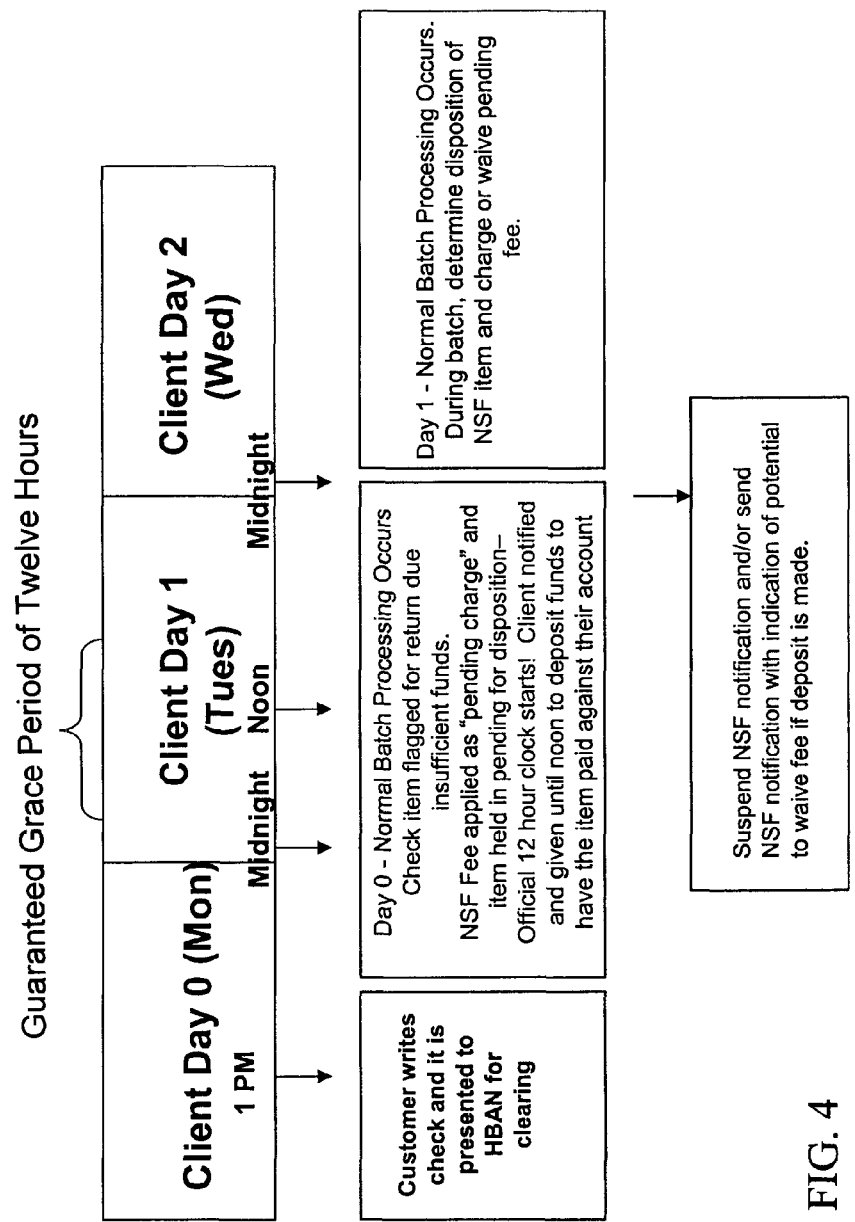
FIG. 4 is another time line showing another aspect of the method FIG. 3 wherein customers also have a twelve hour period of time to fund pending transactions.

FIGS. 3 and 4 illustrate a system and method for encouraging rapid coverage of insufficient funds in financial accounts according to a second embodiment of the present invention. These embodiments are substantially the same as the first embodiment described above but predetermined period of time or grace period before returning checks and ACH debit transactions to the presenter so that the account holder can fund the transaction. That is, if an account holder writes a check or ACH withdrawal and there is insufficient funds in their account for the transaction and the financial institution chooses not to pay the item into overdraft, before returning the check to the presenter, the financial institution notifies the account holder with an automated electronic alert or notice and requests them to fund their account within the predetermined period of time or grace period. If the account holder timely funds their account for the transaction, the item will be paid rather than returned to the presenter and the account holder is not charged a non-sufficient funds (NSF) fee. If the account holder does not timely fund the account for the transaction, the item is returned to the presenter and the account holder is charged an NSF fee. In this illustrated embodiment, the grace period for curing an overdraft is twenty-four hours from processing the transaction and the grace period for funding a pending transaction is twelve hours from the normal processing when the transaction is flagged for return. It is noted that while these two illustrated grace periods are different periods of time, they can alternatively be the same period of time. It is also noted that either of these grace periods can alternatively be any other suitable predetermined periods of time.

Any of the features or attributes of the above the above described embodiments and variations can be used in combination with any of the other features and attributes of the above described embodiments and variations as desired.

It is apparent from the above detailed description of preferred embodiments of the present invention, that the present invention encourages rapid payoff of overdrafts and/or insufficient funds, and provides a sense of fairness to customers.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A computer-implemented method for performing financial services comprising the steps of:
   electronically determining an account balance for a financial account of a customer after receiving a completed transaction against the financial account which subtracts a monetary amount from the financial account;
   if the account balance is negative as a result of the completed transaction, electronically determining after a predetermined period of time whether the negative balance of the financial account was cured;
   electronically assessing an overdraft fee to the financial account if the negative balance of the financial account was not cured during the predetermined period of time; and
   wherein the predetermined period of time is at least until the next day.

2. The method according to claim 1, wherein the predetermined period of time is at least twenty four hours.

3. The method according to claim 1, further comprising the step of electronically sending an electronic notice of the negative balance to the customer after determining the account balance is negative and before an end of the predetermined period of time.

4. The method according to claim 3, wherein the electronic notice is sent in real-time at determining the account balance is negative.

5. The method according to claim 3, wherein the electronic notice is sent in real-time at pre-batch ACH processing.

6. The method according to claim 3, wherein the electronic notice is sent in real-time at batch ACH processing.

7. The method according to claim 3, wherein the electronic notice is sent the morning of the next day after determining the account balance is negative.

8. The method according to claim 1, wherein the completed transaction for the financial account requires ACH processing.

9. The method according to claim 1, wherein the financial account is a checking account.

10. The method according to claim 1, wherein at least until the next day is the next business day.

11. The method according to claim 1, wherein at least until the next day is the next calendar day.

12. The method according to claim 1, wherein the financial account is provided the predetermined period of time to cure the negative balance without incurring additional costs due to the negative balance of the financial account.

13. A financial management system comprising:
    a computer readable medium;
    at least one processor in communication with the computer readable medium; and
    wherein the computer readable medium and the at least one processor are configured to:
    electronically determine an account balance for a financial account of a customer after receiving a completed transaction against the financial account which subtracts a monetary amount from the financial account;
    if the account balance is negative as a result of the completed transaction, electronically determine after a predetermined period of time whether the negative balance of the financial account was cured;
    assess an overdraft fee to the financial account if the negative balance of the financial account was not cured during the predetermined period of time; and
    wherein the predetermined period of time is at least until the next day.

14. The financial management system according to claim 13, wherein the predetermined period of time is at least twenty four hours.

15. The financial management system according to claim 13, wherein the computer readable medium and the at least one processor are configured to electronically send an automated electronic notice of the negative balance to the customer after determining the account balance is negative and before an end of the predetermined period of time.

16. The financial management system according to claim 15, wherein the electronic notice is sent in real-time at determining the account balance is negative.

17. The financial management system according to claim 15, wherein the electronic notice is sent in real-time at pre-batch ACH processing.

18. The financial management system according to claim 15, wherein the electronic notice is sent in real-time at batch ACH processing.

19. The financial management system according to claim 15, wherein the electronic notice is sent the morning of the next day after determining the account balance is negative.

20. The financial management system according to claim 13, wherein the completed transaction for the financial account requires ACH processing.

21. The financial management system according to claim 13, wherein the financial account is a checking account.

22. The financial management system according to claim 13, wherein at least until the next day is the next business day.

23. The financial management system according to claim 13, wherein at least until the next day is the next calendar day.

24. The financial management system according to claim 13, wherein the financial account is provided the predetermined period of time to cure the negative balance without incurring additional costs due to the negative balance of the financial account.

25. A computer-implemented method for performing financial services comprising the steps of:
    electronically determining an account balance for a financial account of a customer after receiving a completed transaction against the financial account which subtracts a monetary amount from the financial account;
    if the account balance is negative as a result of the completed transaction, electronically determining after a predetermined period of time whether the negative balance of the financial account was cured;
    rebating any assessed overdraft fee for the negative balance to the financial account if the negative balance of the financial account was cured during the predetermined period of time; and
    wherein the predetermined period of time is at least until the next day.

26. The method according to claim 25, wherein the predetermined period of time is at least twenty four hours.

27. The method according to claim 25, further comprising the step of electronically sending an electronic notice of the negative balance after determining the account balance is negative and before an en end of the predetermined time.

28. The method according to claim 27, wherein the electronic notice is sent in real-time at determining the account balance is negative.

29. The method according to claim 27, wherein the electronic notice is sent in real-time at pre-batch ACH processing.

30. The method according to claim 27, wherein the electronic notice is sent in real-time at batch ACH processing.

31. The method according to claim 27, wherein the electronic notice is sent the morning of the next day after determining the account balance is negative.

32. The method according to claim 25, wherein the completed transaction for the financial account requires ACH processing.

33. The method according to claim 25, wherein the financial account is a checking account.

34. The method according to claim 25, wherein at least until the next day is the next business day.

35. The method according to claim 25, wherein at least until the next day is the next calendar day.

36. The method according to claim 25, wherein the financial account is provided the predetermined period of time to cure the negative balance without incurring additional costs due to the negative balance of the financial account.

37. A financial management system comprising software stored on a computer-readable medium and operable to:
   a computer readable medium;
   at least one processor in communication with the computer readable medium; and
   wherein the computer readable medium and the at least one processor are configured to:
   electronically determine an account balance for a financial account of a customer after receiving a completed transaction against the financial account which subtracts a monetary amount from the financial account;
   if the account balance is negative as a result of the completed transaction, electronically determine after a predetermined period of time whether the negative balance of the financial account was cured;
   rebate any assessed overdraft fee for the negative balance to the financial account if the negative balance of the financial account was cured during the predetermined period of time; and
   wherein the predetermined period of e is at least until the next day.

38. The financial management system according to claim 37, wherein the predetermined period of time is at least until an end of the next day.

39. The financial management system according to claim 37, wherein the wherein the computer readable medium and the at least one processor are configured to send an automated electronic notice of the negative balance after determining the account balance is negative and before an end of the predetermined period of time.

40. The financial management system according to claim 39, wherein the electronic notice is sent in real-time at determining the account balance is negative.

41. The financial management system according to claim 39, wherein the electronic notice is sent in real-time at pre-batch ACH processing.

42. The financial management system according to claim 39, wherein the electronic notice is sent in real-time at batch ACH processing.

43. The financial management system according to claim 39, wherein the electronic notice is sent the morning of the next day after determining the account balance is negative.

44. The financial management system according to claim 37, wherein the completed transaction for the financial account requires ACH processing.

45. The financial management system according to claim 37, wherein the financial account is a checking account.

46. The financial management system according to claim 37, wherein at least until the next day is the next business day.

47. The financial management system according to claim 37, wherein at least until the next day is the next calendar day.

48. The financial management system according to claim 37, wherein the financial account is provided the predetermined period of time to cure the negative balance without incurring additional costs due to the negative balance of the financial account.

* * * * *